(12) United States Patent
Kennard et al.

(10) Patent No.: US 8,958,857 B1
(45) Date of Patent: Feb. 17, 2015

(54) PROTECTIVE CASE FOR A MOBILE ELECTRONIC DEVICE

(71) Applicant: Nottingham Spirk Design Associates, Cleveland, OH (US)

(72) Inventors: Geoffrey Kennard, Chardon, OH (US); Marc Vitantonio, South Russell, OH (US); Patrick Brown, Cleveland Heights, OH (US)

(73) Assignee: Fellowes, Inc., Itasca, IL (US)

( * ) Notice: Subject to any disclaimer, the term of this patent is extended or adjusted under 35 U.S.C. 154(b) by 0 days.

(21) Appl. No.: 13/955,911

(22) Filed: Jul. 31, 2013

(51) Int. Cl.
*H04M 1/00* (2006.01)
*H04M 1/02* (2006.01)

(52) U.S. Cl.
CPC .......... *H04B 1/3888* (2013.01); *H04M 1/0202* (2013.01)
USPC .................. 455/575.8; 455/186.2; 455/575.1; 455/566; 455/550.1; 361/679.02; 361/679.58; 361/679.26; 361/679.15

(58) Field of Classification Search
USPC ............. 455/575.8, 186.2, 575.1, 566, 550.1; 361/679.02, 679.58, 679.26, 679.15
See application file for complete search history.

(56) References Cited

U.S. PATENT DOCUMENTS

| | | | |
|---|---|---|---|
| 5,707,757 A | 1/1998 | Lee | |
| 6,239,968 B1 * | 5/2001 | Kim et al. | 361/679.56 |
| 6,448,490 B1 * | 9/2002 | Katz | 174/377 |
| 6,731,913 B2 | 5/2004 | Humphreys et al. | |
| 6,781,819 B2 * | 8/2004 | Yang et al. | 361/679.09 |
| 6,837,346 B2 * | 1/2005 | Hollingsworth | 190/11 |
| 7,496,195 B2 | 2/2009 | Kramer | |
| 7,613,386 B2 | 11/2009 | Shimamura | |
| 7,663,879 B2 | 2/2010 | Richardson et al. | |
| 8,259,445 B2 * | 9/2012 | Skillman et al. | 361/679.58 |
| 8,295,896 B2 | 10/2012 | Jeon | |
| 8,393,466 B2 | 3/2013 | Rayner | |
| 8,399,764 B2 | 3/2013 | Klosky | |
| 8,453,835 B2 | 6/2013 | So | |
| 8,699,216 B2 * | 4/2014 | Reber | 361/679.26 |

(Continued)

FOREIGN PATENT DOCUMENTS

| | | |
|---|---|---|
| CN | 201220290089 | 6/2012 |
| CN | 202525356 | 11/2012 |

(Continued)

OTHER PUBLICATIONS http://www.lifeproof.com/shop/us_en/iphone-5/iphone-5-case/; Jun. 5, 2013.

(Continued)

*Primary Examiner* — Joseph Arevalo
(74) *Attorney, Agent, or Firm* — Renner, Otto, Boisselle & Sklar, LLP

(57) ABSTRACT

A protective case for a mobile electronic device includes a shell defining a cavity for receiving the mobile electronic device within the cavity. The shelf has an opening at a first end. The protective case also includes a door hingedly connected to the shell at an edge near the first end such that the door rotates about the hinged connection approximately 270 degrees from a closed position substantially closing the opening and a fully open position. The shell includes a recess having a shape corresponding to the outer shape of the door and configured to receive a substantial portion of the door and releasably secure the door when the door is in the fully open position.

18 Claims, 5 Drawing Sheets

(56) References Cited

U.S. PATENT DOCUMENTS

| | | |
|---|---|---|
| 2006/0279924 A1 | 12/2006 | Richardson et al. |
| 2007/0158220 A1 | 7/2007 | Cleereman et al. |
| 2008/0015000 A1 | 1/2008 | Jung |
| 2010/0200456 A1 | 8/2010 | Parkinson |
| 2010/0298025 A1 | 11/2010 | Spence |
| 2011/0058332 A1* | 3/2011 | Skillman et al. ......... 361/679.58 |
| 2012/0050971 A1* | 3/2012 | Seal et al. ................ 361/679.02 |
| 2012/0063073 A1 | 3/2012 | Harada et al. |
| 2012/0074006 A1* | 3/2012 | Monaco et al. .............. 206/320 |
| 2012/0262618 A1 | 10/2012 | Weakly |
| 2012/0275025 A1 | 11/2012 | Parrill |
| 2012/0314354 A1 | 12/2012 | Rayner |
| 2013/0069499 A1* | 3/2013 | Modrell ..................... 312/223.1 |
| 2013/0088130 A1 | 4/2013 | Rayner |
| 2013/0127309 A1 | 5/2013 | Wyner et al. |
| 2014/0144796 A1* | 5/2014 | Ziemba ........................ 206/235 |

FOREIGN PATENT DOCUMENTS

| | | |
|---|---|---|
| CN | 202552579 | 11/2012 |
| CN | 202652296 | 1/2013 |
| CN | 202841236 | 3/2013 |
| CN | 202872861 | 4/2013 |
| JP | 3040063 | 8/1997 |
| JP | 3045854 | 2/1998 |
| JP | 10284855 | 10/1998 |

OTHER PUBLICATIONS http://www.lifeproof.com/shop/us_en/iphone-5/lifeproof-lifejacket-float-for-fre-iphone . . . Jun. 5, 2013.

http://www.alibaba.com/product-gs/630249187/waterproof_and_dustproof_mobile_phone . . . Jun. 5, 2013.

http://seenice.en.alibaba.com/product/918591505-218398846/Hot_Selling_Waterproof . . . Jun. 5, 2013.

http://www.otterbox.com/iPhone5-Armor-Series-Case/ap110-iphone-5, default,pd.html Jun. 5, 2013.

* cited by examiner

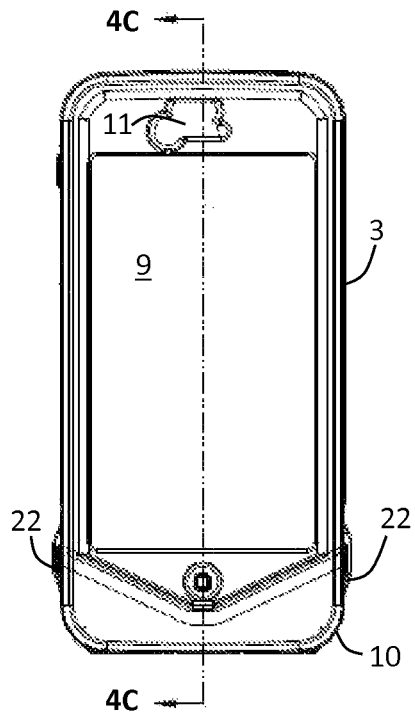
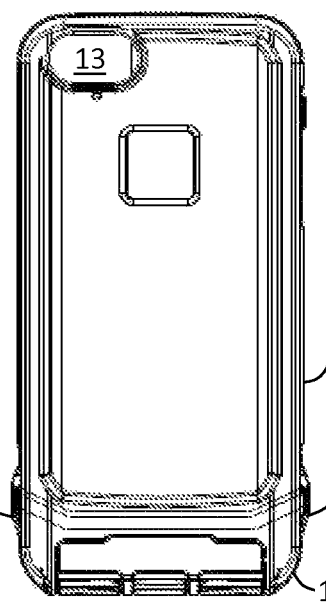
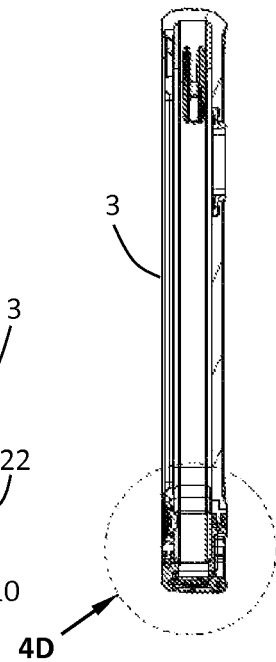
Figure 4A
Figure 4B
Figure 4C
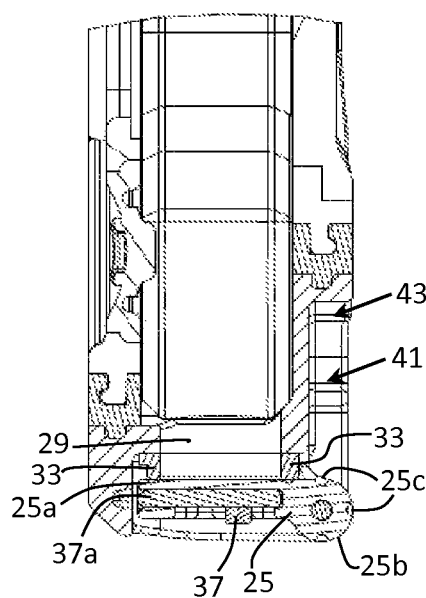
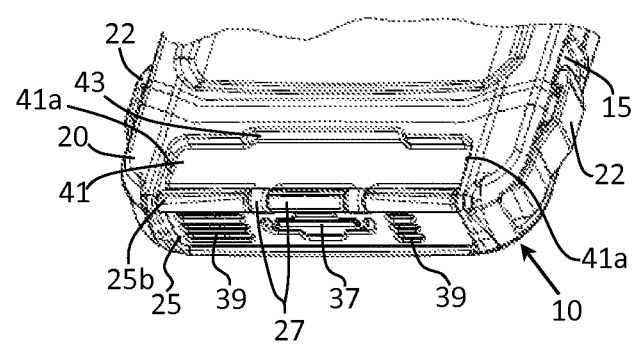
Figure 4D
Figure 4E

US 8,958,857 B1

PROTECTIVE CASE FOR A MOBILE ELECTRONIC DEVICE

FIELD OF THE INVENTION

The present disclosure relates generally to mobile electronic devices such as mobile telephones and smartphones, tablet computers, cellular-connected laptop computers, and similar devices. More particularly, the present disclosure relates to protective cases for mobile electronic devices.

BACKGROUND

Mobile electronic devices such as mobile telephones and smartphones, tablet computers, cellular-connected laptop computers, and similar devices are ever increasing in popularity. While these mobile electronic devices continue to evolve, with an ever increasing list of features and capabilities, the devices still suffer from a long-standing problem: their vulnerability to the elements. These devices are susceptible to damage from general wear and tear, most noticeably the scratching or the devices' bodies and screens. More importantly, the devices are vulnerable to damage from water and dust. Protective cases have therefore been developed in order to protect these devices.

Conventional protective cases offer somewhat enhanced face, side, and back scratch and shock protection for the mobile electronic device, but leave the screen, switches, and ports (e.g., headphone ports, power ports, data ports, etc.) exposed to the environment. Some models may include a screen protector that may be applied as a separate component from the protective case. As these screen protectors are not an incorporated component of the product, however, they protect the screen from scratching, but they do not protect the mobile electronic device from water or dust. Other conventional protective cases may provide some protection against water and dust, but only for the electronics and not the screen.

Protective cases that do provide water and dust protection for the complete devices may not allow for view and/or use of the device's touch screen when the device is in the protective case. More adept conventional protective cases may allow a user to view and use the device's touch screen when the device is inside the protective case. However, while these cases may provide enhanced protection for the complete electronic device, the protective cases are large and cumbersome, turning a small and, some would say, elegant mobile electronic device into a large, inelegant, plastic-covered device.

In addition, some of the more adept conventional protective cases protect ports (e.g., headphone ports, power ports, data ports, etc.) of the mobile device with rubber plugs at ends of rubber flaps. Typically, the plugs insert in the ports to seal the ports from water and dust ingress. The rubber plugs rely on friction from the mobile electronic device's ports to hold the plugs in place. This often results in loose plugs or in blocked ports when the plugs break off from the flaps. Also, when a plug is unplugged to gain access to a port, the flap is left hanging which increases the chances that the flap might catch on objects in the environment of the mobile electronic device and brake off. Also, in some protective cases, a user must continually hold the flap open with their fingers for continued access to the port because the rubbery flap resists pivoting and is biased towards getting the plug back in the port or towards the flap covering the port.

SUMMARY OF THE INVENTION

This disclosure provides a protective case for a mobile electronic device that protects the complete device and uses a door to protect the ports of the mobile electronic device. The door is hingedly attached to the rest of the case, which allows the door to easily pivot approximately 270 degrees from a closed position in which the ports are fully protected to an open position in which the door stows away into a recess. The door and the recess include complementary features that allow for the door to be retained securely in the fully open position. These features produce a tidy-looking design in which the door is also less prone to catch on items in its environment and break off.

The disclosed protective case provides weatherproof and dustproof protection for the complete mobile electronic device in a state where the mobile electronic device is operable for telephone calls, web browsing, interaction with apps, etc. The ports of the mobile electronic device are protected from water and dust when the door is in the closed position and become easily accessible by rotation of the door from the closed position to the fully open position. Also, the disclosed protective case provides protection against damage from general wear and tear including protection of the screen and body from scratching.

These and further features of the present invention will be described with reference to the attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 4A illustrates a front view of the exemplary protective case of FIG. 1 with its door closed.

FIG. 4B illustrates a rear view of the exemplary protective case of FIG. 1 with its door closed.

FIG. 4C illustrates a cross section of the exemplary protective case with its door closed as indicated by FIG. 4A.

FIG. 4D illustrates a magnified view of a portion of the exemplary protective case with its door closed as indicated by FIG. 4C.

FIG. 4E illustrates a cutout view of a portion of the exemplary protective case with its door closed.

DETAILED DESCRIPTION

Figure 1:
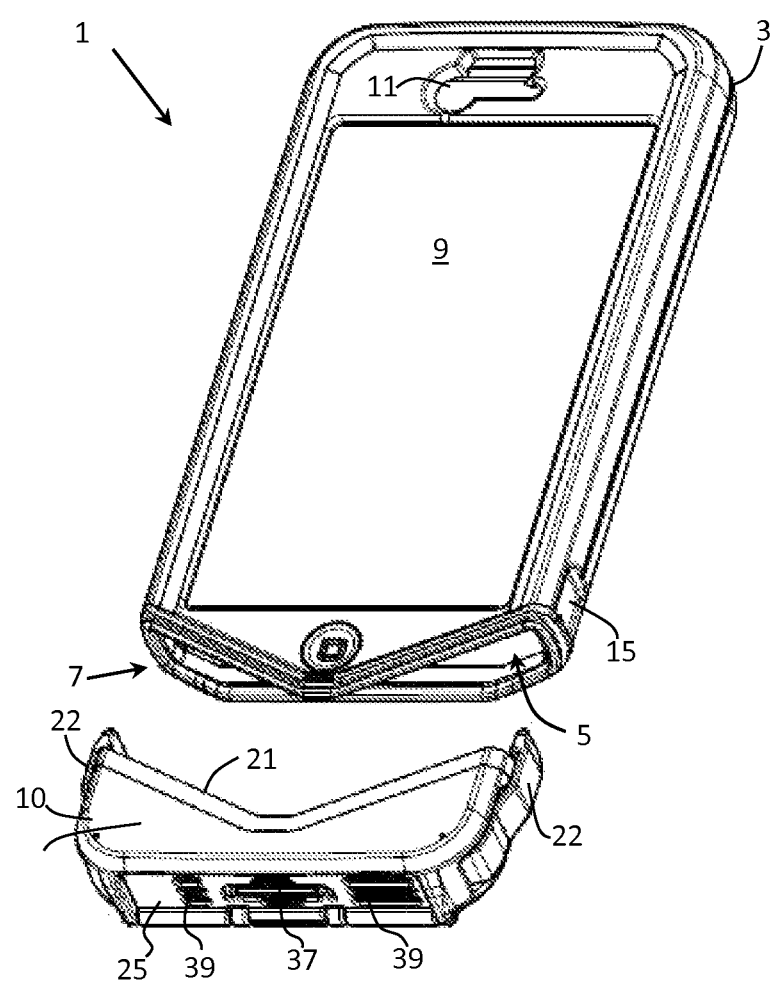
FIG. 1 illustrates an exploded view of an exemplary protective case for a mobile electronic device.

FIG. 1 illustrates an exploded view of an exemplary protective case 1 for a mobile electronic device. The case 1 includes a shell 3 that defines a cavity 5 with an open end 7 for receiving a portion of the mobile electronic device within the cavity 5. The case 1 also includes an end cap 10 that is removably connectable to the shell 3 at the open end 7 of the shell 3 to encase the electronic device. The case 1 includes a connection mechanism in the form of snap locks 22 in the end cap 10 and corresponding recesses 15 in the shell 3. The end cap 10 includes a door 25 that will be described in more detail below.

FIGS. 2A-5E illustrate the exemplary protective case 1 in further details. FIGS. 2A-2E illustrate the case 1 with the door 25 fully open. FIGS. 3A-3E illustrate the case 1 with the door 25 partially open. FIGS. 4A-4E illustrate the case 1 with the door 25 closed, but unlatched. FIGS. 5A-5E illustrate the case 1 with the door 25 closed and latched.

As shown in FIGS. 2A, 3A, 4A and 5A, the shell 3 includes a protective membrane 9 located to correspond to the location of a screen of the mobile electronic device. The protective membrane 9 allows viewing of the screen of the device and may allow for the use of touchscreen features of the device's screen. The shell 3 further includes a water and dust resistant acoustic vent 11 located to correspond to the speaker of the mobile electronic device. As shown in FIGS. 2B, 3B, 4B, and 5B, the shell 3 also includes a protective membrane 13 located to correspond to the camera lens of the mobile electronic device.

In one embodiment, the shell 3 is substantially comprised of a unitary shell. In other embodiments (not shown), the shell 3 may be comprised of multiple portions (e.g., front and back halves) that assemble together to form the shell 3.

As disclosed above, the case 1 also includes the end cap 10, which includes a main cap portion 20 that includes a first end 21 that connects to the shell 3. A connection mechanism provides the connection between the end cap 10 and the shell 3 that is releasable. In the illustrated embodiment the connection mechanism includes two snap locks 22 attached to the end cap 10 that snap and lock to corresponding recesses 15 in the shell 3. In other embodiments the connection mechanism may be other than snap locks and recesses.

Figures 2A, 2B, 2C:
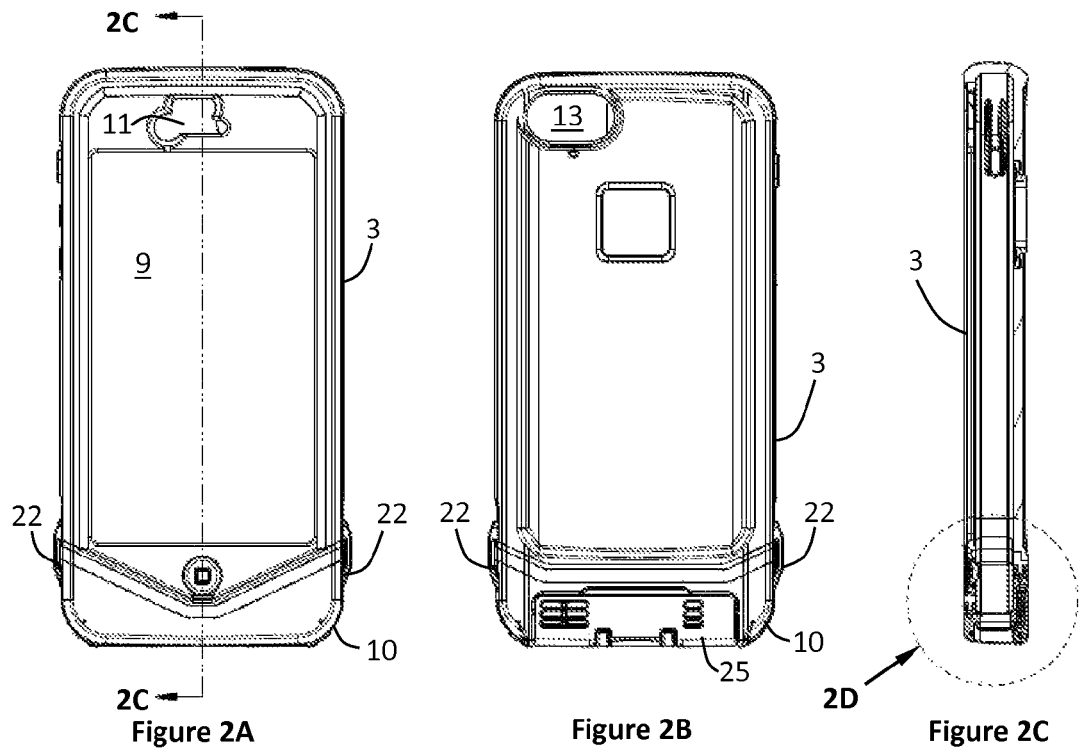
FIG. 2A illustrates a front view of the exemplary protective case of FIG. 1 with its door fully open.
FIG. 2B illustrates a rear view of the exemplary protective case of FIG. 1 with its door fully open.
FIG. 2C illustrates a cross section of the exemplary protective case with its door fully open as indicated by FIG. 2A.
Figures 2D, 2E:
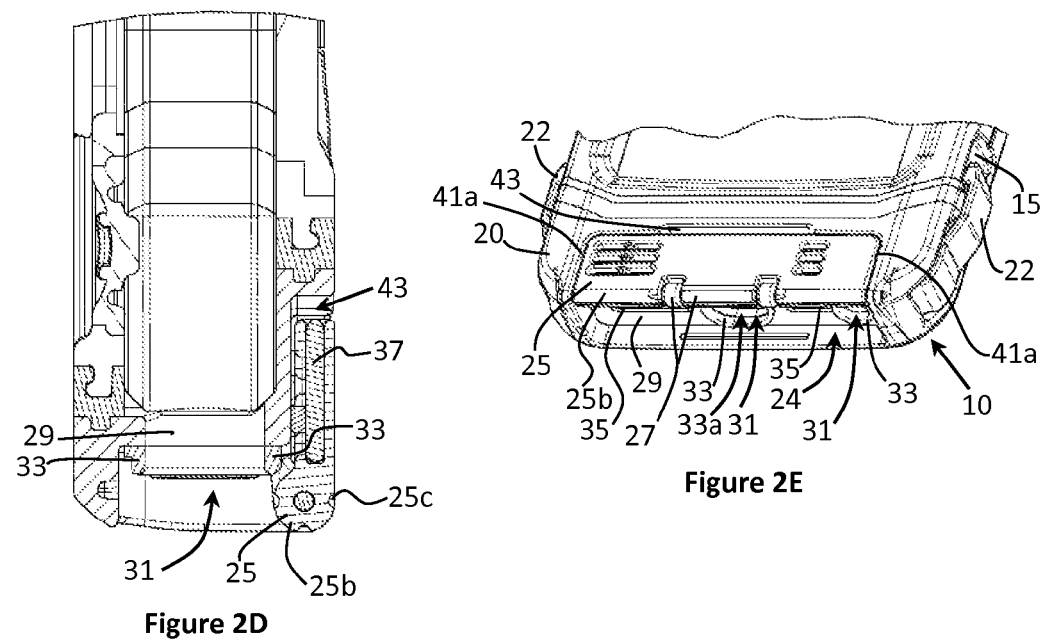
FIG. 2D illustrates a magnified view of a portion of the exemplary protective case with its door fully open as indicated by FIG. 2C.
FIG. 2E illustrates a cutout view of a portion of the exemplary protective case with its door fully open.
Figure 3A:
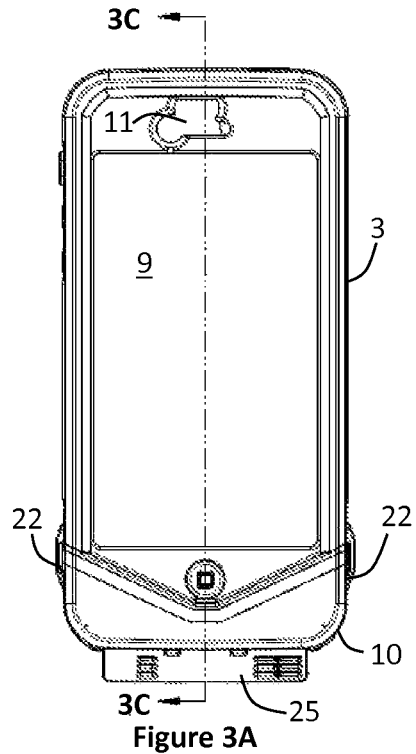
FIG. 3A illustrates a front view of the exemplary protective case of FIG. 1 with its door partially open.
Figure 3B:
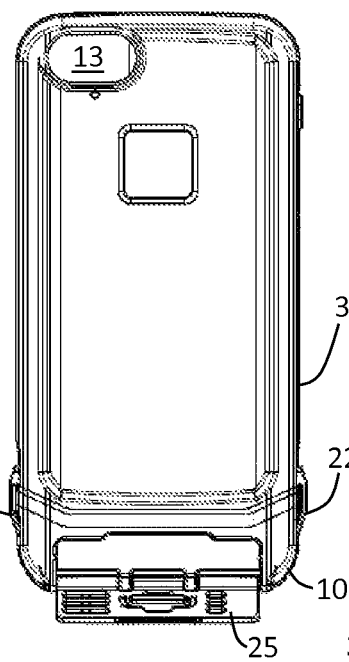
FIG. 3B illustrates a rear view of the exemplary protective case of FIG. 1 with its door partially open.
Figure 3C:
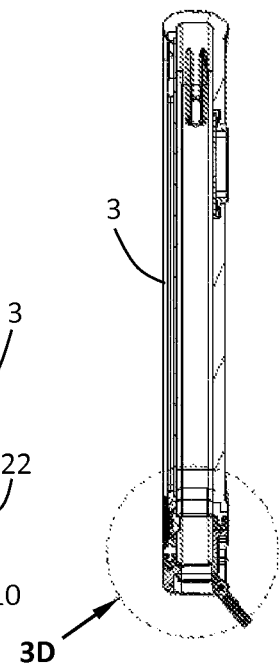
FIG. 3C illustrates a cross section of the exemplary protective case with its door partially open as indicated by FIG. 3A.
Figure 3D:
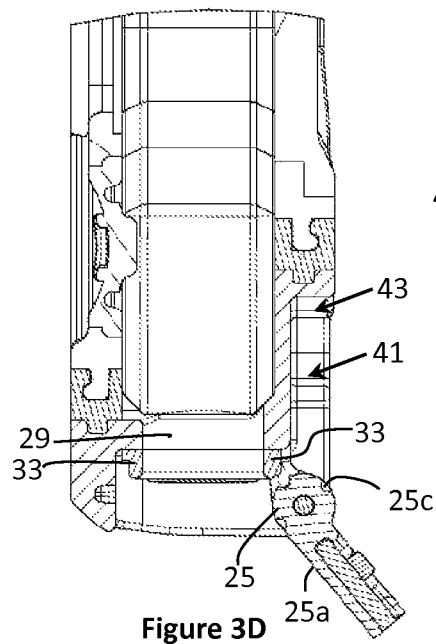
FIG. 3D illustrates a magnified view of a portion of the exemplary protective case with its door partially open as indicated by FIG. 3C.
Figure 3E:
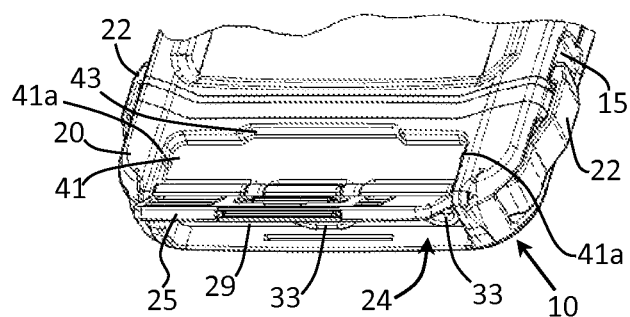
FIG. 3E illustrates a cutout view of a portion of the exemplary protective case with its door partially open.

As shown in FIGS. 2E and 3E, at the opposite end from the connection between end cap 10 and shell 3, the end cap 10 includes an opening 24. The end cap 10 also includes the door 25 and a hinged connection 27 between the door 25 and the main cap portion 20. The hinged connection 27 between the door 25 and the main cap portion 20 is provided near an edge of the main cap portion 20. As shown in the progression from FIGS. 2A-2E to FIGS. 3A-3E to FIGS. 4A-4E, the door 25 rotates about the hinged connection 27 approximately 270 degrees from the fully open position to the partially open position to the closed position, respectively. In the closed position shown in FIG. 4E, the door 25 substantially closes the opening 24 of the main cap portion 20.

In one embodiment, the hinged connection 27 includes at least one pin (not shown) that connects to the main cap portion 20 and the door 25 so that the door 25 may rotate about the pin. In one embodiment, the door 25 includes a cylindrical portion 25b that extends along the hinged connection 27 and provides the door portion of the hinged connection 27 between the door 25 and the main cap portion 20. In one embodiment, the cylindrical portion 25b includes grips or knurls 25c to grip the skin of a finger of a user applying a tangential rotational force to the cylindrical portion 25b to incite the door 25 to rotate about the hinged connection 27.

As shown in FIGS. 2D-2E, 3D-3E, 4D and 5D the main cap portion 20 includes an internal wall 29 that divides the cavity 5 of the case 1 into a mobile electronic device side of the cavity and an opening 24 side of the cavity. The internal wall 29 has apertures 31 that correspond to ports of the mobile electronic device such as, for example, a power port, a data port, or an audio port of the mobile electronic device. The internal wall 29 may include one or more apertures 31 depending on the mobile electronic device.

Disposed in the opening 24 are elastomeric seals 33. The elastomeric seals 33 have seal apertures 33A that align with the apertures 31 of the internal wall 29 that correspond to the ports of the mobile electronic device. The ports (e.g., power port, data port, audio port, etc.) of the mobile electronic device are accessible through the apertures 31 and the seal apertures 33A when the door 25 is in the open position as shown in FIG. 2A-2E. As shown in FIGS. 2D-2E, 3D-3E, 4D and 5D, the seals 33 extend away from the internal wall 29 towards the opening 24. One or more seals 33 may be included depending on the mobile electronic device.

Figures 5A, 5B, 5C:
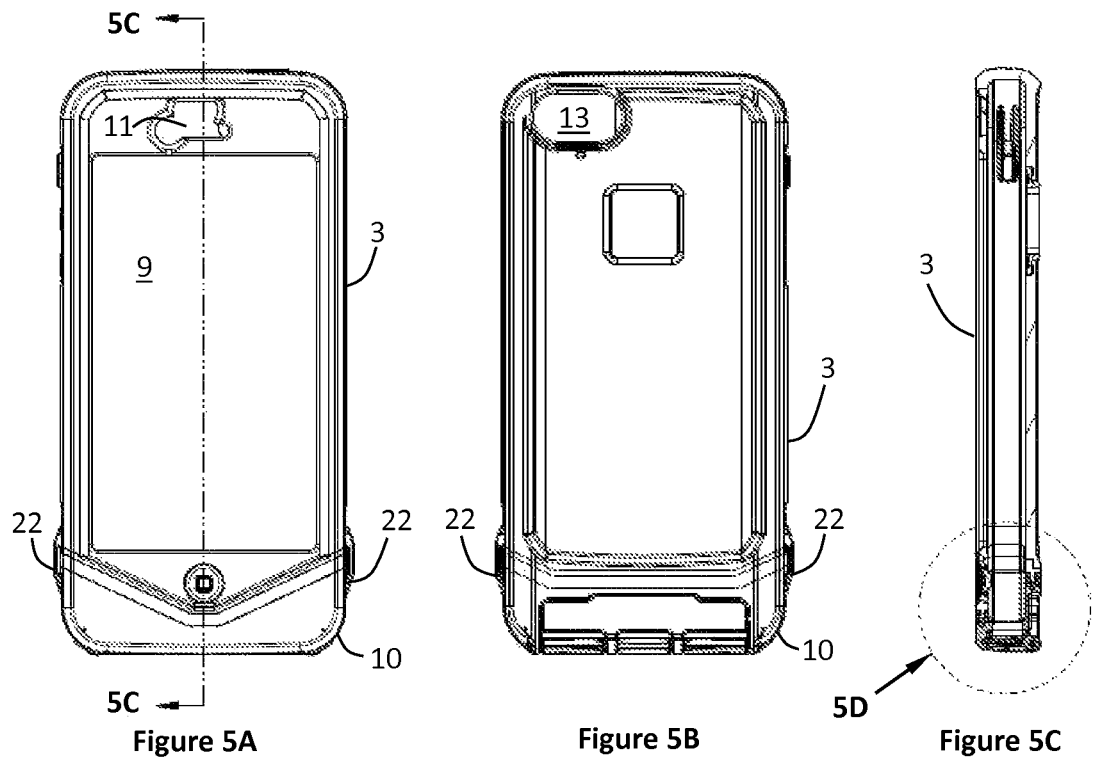
FIG. 5A illustrates a front view of the exemplary protective case of FIG. 1 with its door closed and latched.
FIG. 5B illustrates a rear view of the exemplary protective case of FIG. 1 with its door closed and latched.
FIG. 5C illustrates a cross section of the exemplary protective case with its door closed and latched as indicated by FIG. 5A.
Figures 5D, 5E:
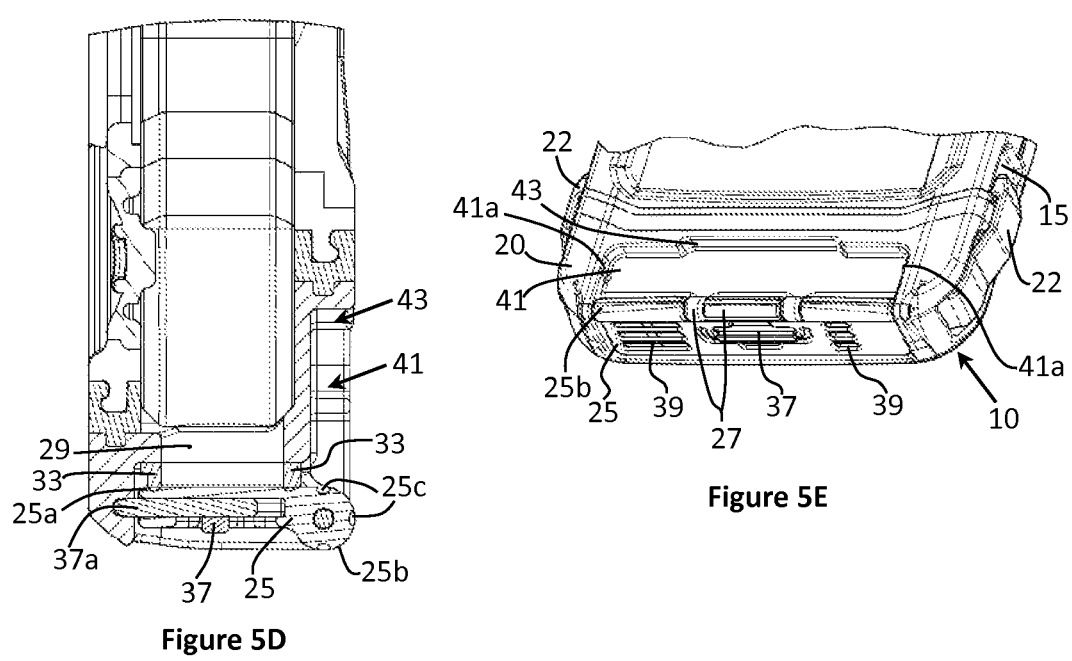
FIG. 5D illustrates a magnified view of a portion of the exemplary protective case with its door closed and latched as indicated by FIG. 5C.
FIG. 5E illustrates a cutout view of a portion of the exemplary protective case with its door closed and latched.

As discussed above and as shown in the progression from FIGS. 2A-2E to FIGS. 3A-3E to FIGS. 4A-4E, the door 25 rotates about the hinged connection 27 approximately 270 degrees from the fully open position to the partially open position to the closed position, respectively. In the closed position, the door 25 substantially closes the opening 24 of the main cap portion 20. In the closed position, as shown in FIGS. 4D and 5D, the seals 33 and the door 25 interact. The seals 33 are made of an elastomer material such as rubber. The door 25 is made of a comparatively rigid material such as PVC or Lexan and its wall 25a has a relatively smooth surface. Thus, although in the illustrations of FIGS. 4D and 5D the interface between the seals 33 and the door 25 is shown as an interference, in practice, force exerted on the seals 33 by the wall 25a of the door 25 causes the seals 33 to temporarily deform or contract to, together with the wall 25a, form seals that seal the apertures 31. The seals 33 have dimensions that permit the interaction between the seals 33 and the door 25 when the door 25 is in the closed position.

To retain the door 25 in the closed position, the door 25 includes a latch 37 disposed within the door 25. The latch 37 is slidable such that in a latched position, as shown in FIGS. 5D and 5E, a latching portion 37a of the latch 37 protrudes from a side of the door 25 and into a corresponding latch receiving portion of the main cap portion 20. This way the door 25 is securely latched in the closed position.

As shown in FIG. 2E, the internal wall 29 also has apertures 35 corresponding to speakers and/or microphones of the mobile electronic device and the end cap 10 includes acoustic vents (not shown) aligned with the apertures 35 to allow sound to travel through the apertures 35 while preventing ingress of liquids into the mobile electronic device side of the cavity 5. Corresponding to the apertures 35, the door 25 has grills 39 disposed on the wall 25a of the door 25. The grills 39 align with the acoustic vents and the apertures 35 corresponding to the speakers and/or microphone of the mobile electronic device to allow sound to travel through the grills. The numbers and sizes of the apertures 35 and the grills will vary depending on the mobile electronic device.

When the door 25 is closed and latched, as shown in FIGS. 5A-5E, the case 1 fully encloses the mobile electronic device. The case 1 provides scratch protection and shock absorption around the mobile electronic device as well as protection from the environment such as protection from water, dirt, and dust. Thus the disclosed features provides a solution that allows for weatherproof and dustproof protection of the mobile electronic device in a state where the mobile electronic device is operable for a substantial number of operations including telephone calls, web browsing, interaction with apps, etc.

To release the door 25 from the closed position, the latch 37 may be slid to an unlatched position as shown in FIGS. 4D and 4E. In the unlatched position the latching portion 37a retracts from the corresponding latch receiving portion of the main cap portion 20. Where the cylindrical portion 25b includes the grips or knurls 25c, a user may apply a tangential rotational force to the cylindrical portion 25b to incite the door 25 to rotate about the hinged connection 27 to open.

As disclosed above, the door 25 rotates about the hinged connection 27 approximately 270 degrees. Thus the door 25 rotates from the closed position to the partially open position to the fully open position as shown in the progression from FIGS. 4A-4E to FIGS. 3A-3E to FIGS. 2A-2E, respectively.

The main cap portion 20 includes a recess 41 that has a shape that corresponds to the outer shape of the door 25. In the fully open position of the door 25, the recess 41 receives the door 25 or at least a substantial portion of it. The recess includes features 41a that pinch the door 25 and thus secure the door 25 in the recess 41. In one embodiment, the door 25 instead of the recess 41 includes features that secure the door 25 in the recess 41. In yet another embodiment, both the door 25 and the recess 41 include features to secure the door 25 in the recess 41.

The main cap portion 20 also includes a notch 43 adjacent to the recess 41. The notch 43 allows a finger or a fingernail of a user at least partial access to the side or bottom of the door 25 when the door 25 is secured in the recess 41 such that the user may apply a rotational force to the door 25 to incite release of the door 25 from the recess 41 and the features 41a for the door 25 to rotate about the hinged connection 27.

These disclosed features represent improvements over the prior art. The 270 degree rotation of the door 25 in combination with the recess 41 and the features 41a produces a secure stow-away location for the door 25 in which the door 25 is substantially flush with the rest of the case 1. Thus in the fully open position the door 25 is out of the way and less prone to catch on items in its environment and break off. These features also eliminate the prior art need to hold open flaps that provide access to the ports of the mobile electronic device.

In the closed position, the door 25 is similarly out of the way and less prone to catch on items in its environment and break off. The door 25 in the closed position in combination with the other disclosed features provides a solution that allows for weatherproof and dustproof protection of the mobile electronic device in a state where the mobile electronic device is operable for a substantial number of operations including telephone calls, web browsing, interaction with apps, etc. From the closed position the ports of the mobile electronic device become easily accessible by operation of the latch 39 and rotation of the door 25 to the fully open position.

Although the illustrated protective case 1 corresponds to a specific mobile electronic device (i.e., an Apple iPhone), it should be understood that the features of the disclosed invention may be available for other mobile electronic devices.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A protective case for a mobile electronic device comprising:
    a shell defining a cavity with an open end for receiving a portion of the mobile electronic device within the cavity; and
    an end cap removably connectable to the shell at the open end to encase the electronic device, the end cap comprising:
    a main cap portion including at least part of a connection mechanism for removably connecting a first end of the end cap to the shell and an opening at an opposite end, and
    a door hingedly connected to the main cap portion at an edge of the main cap portion such that the door rotates about the hinged connection between the door and the main cap from a closed position to an open position, wherein the main cap portion includes a recess having a shape corresponding to the outer shape of the door and configured to receive a portion of the door and releasably secure the door when the door is in the open position;

an internal wall dividing a cavity of the main cap portion into an opening side of the cavity and a mobile electronic device side of the cavity, the internal wall having at least one aperture corresponding to at least one of a power port, a data port, and an audio port of the mobile electronic device, and at least one elastomeric seal disposed in the opening side of the cavity and having a seal aperture aligned with the at least one aperture corresponding to the at least one of the power port, the data port, and the audio port of the mobile electronic device of the internal wall such that the at least one of the power port, the data port, and the audio port of the mobile electronic device is accessible through the aperture and the seal aperture when the door is in the open position, the seal extending away from the internal wall of the main cap portion towards the opening of the main cap portion and having dimensions that cause the door to interact with the at least one elastomeric seal when the door is in the closed position.

2. The protective case of claim 1, the end cap comprising:
at least one pin connected to the main cap portion and the door to provide the hinged connection between the main cap portion and the door for the door to rotate about the at least one pin.

3. The protective case of claim 1, wherein
the main cap portion comprises:
   an internal wall dividing a cavity of the main cap portion into an opening side of the cavity and a mobile electronic device side of the cavity, the internal wall having at least one aperture corresponding to at least one of a speaker and a microphone of the mobile electronic device,
   at least one acoustic vent aligned with the at least one aperture corresponding to the at least one of the speaker and the microphone of the mobile electronic device to allow sound to travel through the at least one aperture corresponding to the at least one of the speaker and the microphone of the mobile electronic device while preventing ingress of liquids into the mobile electronic device side of the cavity, and
the door comprises:
   at least one grill disposed on a main wall of the door and aligned with the at least one acoustic vent and the at least one aperture corresponding to the at least one of the speaker and the microphone of the mobile electronic device to allow sound to travel through the at least one grill.

4. The protective case of claim 1, the main cap portion comprising:
a notch adjacent to the recess and configured to allow a finger or a fingernail of a user at least partial access to a side of the door when the door is releasably secured by the recess in the fully open position such that the user may apply a rotational force to the door to incite release of the door from the recess and rotation of the door about the hinged connection.

5. The protective case of claim 1, the door comprising:
a latch disposed within the door as to be slidable such that in a latched position a latching portion of the latch protrudes from a side of the door and into a corresponding latch receiving portion of the main cap and in an unlatched position retracts from the corresponding latch receiving portion of the main cap.

6. The protective case of claim 1, the door comprising:
at least one cylindrical portion extending along the hinged connection and providing the door portion of the hinged connection between the door and the main cap portion, the at least one cylindrical portion including a knurled surface configured to grip a finger of a user applying a tangential rotational force to the at least one cylindrical portion to incite rotation of the door about the hinged connection.

7. A protective case for a mobile electronic device comprising:
a shell defining a cavity for receiving the mobile electronic device within the cavity, the shell having an opening at a first end; and
a door hingedly connected to the shell at an edge near the first end such that the door rotates about the hinged connection from a closed position to an open position,
wherein the shell includes a recess having a shape corresponding to the outer shape of the door and configured to receive a substantial portion of the door and releasably secure the door when the door is in the open position,
an internal wall dividing the cavity into a mobile electronic device side of the cavity and an opening side of the cavity, the internal wall having at least one aperture corresponding to at least one of a power port, a data port, and an audio port of the mobile electronic device, and
at least one elastomeric seal disposed in the opening side of the cavity and having a seal aperture aligned with the at least one aperture corresponding to the at least one of the power port, the data port, and the audio port of the mobile electronic device of the internal wall such that the at least one of the power port, the data port, and the audio port of the mobile electronic device is accessible through the aperture and the seal aperture when the door is in the open position, the seal extending away from the internal wall towards the opening and having dimensions that cause the door to interact with the at least one elastomeric seal when the door is in the closed position such that the interface between the at least one elastomeric seal and the corresponding surface of the door seal the aperture.

8. The protective case of claim 7 comprising:
at least one pin connected to the shell and the door to provide the hinged connection between the shell and the door for the door to rotate about the at least one pin.

9. The protective case of claim 7, wherein:
the internal wall having at least one aperture corresponding to at least one of a speaker or a microphone of the mobile electronic device,
the shell comprising:
at least one acoustic vent aligned with the at least one aperture corresponding to the at least one of the speaker or the microphone of the mobile electronic device to allow sound to travel through the at least one aperture corresponding to the at least one of the speaker or the microphone of the mobile electronic device while preventing ingress of liquids into the mobile electronic device side of the cavity, and
the door comprises:
at least one grill disposed on a main wall of the door and aligned with the at least one acoustic vent and the at least one aperture corresponding to the at least one of the speaker or the microphone of the mobile electronic device to allow sound to travel through the at least one grill.

10. The protective case of claim 7, the shell comprising:
a notch adjacent to the recess and configured to allow a finger or a fingernail of a user at least partial access to a side of the door when the door is releasably secured by the recess in the open position such that the user may apply a rotational force to the door to incite release of the door from the recess and rotation of the door about the hinged connection.

11. The protective case of claim 7, the door comprising:
a latch disposed within the door as to be slidable such that in a latched position a latching portion of the latch protrudes from a side of the door and into a corresponding latch receiving portion of the shell to lock the door and in an unlatched position retracts from the corresponding latch receiving portion to unlock the door.

12. The protective case of claim 7, the door comprising:
at least one cylindrical portion extending along the hinged connection and providing the door portion of the hinged connection between the door and the shell, the at least one cylindrical portion including a knurled surface configured to grip skin of a user applying a tangential rotational force to the at least one cylindrical portion to incite rotation of the door about the hinged connection.

13. The protective case of claim 7 comprising:
at least one pin connected to the shell and the door to provide the hinged connection between the shell and the door for the door to rotate about the at least one pin.

14. A protective case for a mobile electronic device comprising:
a shell defining a cavity for receiving the mobile electronic device within the cavity, the shell having an opening at a first end;
a door hingedly connected to the shell at an edge near the first end such that the door rotates about the hinged connection from a closed position to an open position, wherein the shell includes a recess having a shape corresponding to the outer shape of the door and configured to receive a portion of the door and releasably secure the door when the door is in the open position;
an internal wall dividing the cavity into a mobile electronic device side of the cavity and an opening side of the cavity, the internal wall having at least one aperture corresponding to at least one of a power port, a data port, and an audio port of the mobile electronic device; and
at least one elastomeric seal disposed in the opening side of the cavity and having a seal aperture aligned with the at least one aperture corresponding to the at least one of the power port, the data port, and the audio port of the mobile electronic device of the internal wall such that the at least one of the power port, the data port, and the audio port of the mobile electronic device is accessible through the aperture and the seal aperture when the door is in the open position, the seal extending away from the internal wall towards the opening and having dimensions that cause the door to interact with the at least one elastomeric seal when the door is in the closed position, wherein at least one of:
the shell comprises a notch adjacent to the recess and configured to allow a finger or a fingernail of a user at least partial access to a side of the door when the door is releasably secured by the recess in the open position such that the user may apply a rotational force to the door to incite release of the door from the recess and rotation of the door about the hinged connection, or the door comprises at least one cylindrical portion extending along the hinged connection and providing the door portion of the hinged connection between the door and the shell, the at least one cylindrical portion including a knurled surface configured to grip skin of a user applying a tangential rotational force to the at least one cylindrical portion to incite rotation of the door about the hinged connection.

15. The protective case of claim 14 comprising:
at least one pin connected to the shell and the door to provide the hinged connection between the shell and the door for the door to rotate about the at least one pin.

16. The protective case of claim 14, wherein
the internal wall has at least one aperture corresponding to at least one of a speaker and a microphone of the mobile electronic device,
the case comprises at least one acoustic vent aligned with the at least one aperture corresponding to the at least one of the speaker and the microphone of the mobile electronic device to allow sound to travel through the at least one aperture corresponding to the at least one of the speaker and the microphone of the mobile electronic device while preventing ingress of liquids into the mobile electronic device side of the cavity, and
the door comprises at least one grill disposed on a main wall of the door and aligned with the at least one acoustic vent and the at least one aperture corresponding to the at least one of the speaker and the microphone of the mobile electronic device to allow sound to travel through the at least one grill.

17. The protective case of claim 14, the door comprising:
a latch disposed within the door as to be slidable such that in a latched position a latching portion of the latch protrudes from a side of the door and into a corresponding latch receiving portion of the shell to lock the door and in an unlatched position retracts from the corresponding latch receiving portion to unlock the door.

18. A protective case for a mobile electronic device comprising:
a shell defining a cavity for receiving the mobile electronic device within the cavity, the shell having an opening at a first end; and
a door hingedly connected to the shell at an edge near the first end such that the door rotates about the hinged connection from a closed position to an open position,
the shell comprises:
an internal wall dividing the cavity into a mobile electronic device side of the cavity and an opening side of the cavity, the internal wall having at least one aperture corresponding to at least one of a power port, a data port, and an audio port of the mobile electronic device, and
at least one elastomeric seal aligned with the at least one aperture corresponding to the at least one of the power port, the data port, and the audio port of the mobile electronic device of the internal wall such that the at least one of the power port, the data port, and the audio port of the mobile electronic device is accessible through the aperture when the door is in the open position, and such that the seal when the door is in the closed position, the at least one elastomeric seal seals the aperture corresponding to the at least one of the power port, the data port, and the audio port of the mobile electronic device.

* * * * *